(No Model.)

C. S. WHITE.
FILTER FOR GASOLINE STOVES.

No. 536,364. Patented Mar. 26, 1895.

Witnesses
C. H. Hill
R. Blume

Inventor
Charles S. White.
By Attorney
P. H. Gunckel

United States Patent Office.

CHARLES S. WHITE, OF MINNEAPOLIS, MINNESOTA, ASSIGNOR OF ONE-HALF TO J. SHUEY BEAR, OF SAME PLACE, AND GEORGE N. MORAN, OF EDEN PRAIRIE, MINNESOTA.

FILTER FOR GASOLINE-STOVES.

SPECIFICATION forming part of Letters Patent No. 536,364, dated March 26, 1895.

Application filed June 4, 1894. Serial No. 513,358. (No model.)

*To all whom it may concern:*

Be it known that I, CHARLES S. WHITE, a citizen of the United States, residing at Minneapolis, in the county of Hennepin and State of Minnesota, have invented a certain new and useful Improvement in Filters for Gasoline-Stoves, of which the following is a specification.

My invention relates to means for use in connection with gasoline burners for separating foreign substances from the gasoline.

The object of the invention is to interpose a filtering device between the supply tank and burner (in either a heating or lighting apparatus) which will effectually separate from the gasoline particles of foreign matter, and also liquid of greater specific gravity than gasoline.

My improvements are illustrated in the accompanying drawings, in which—

Figure 1:
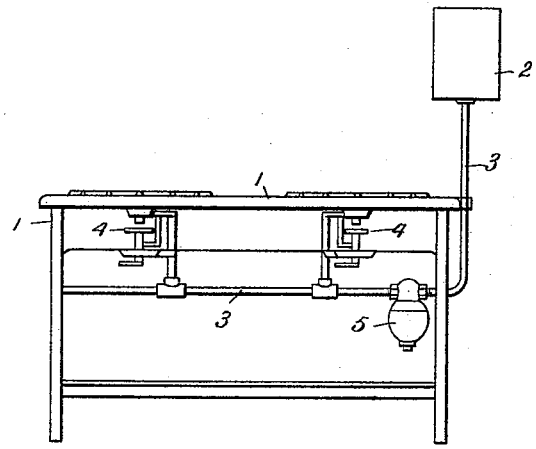
Figures 2, 4:
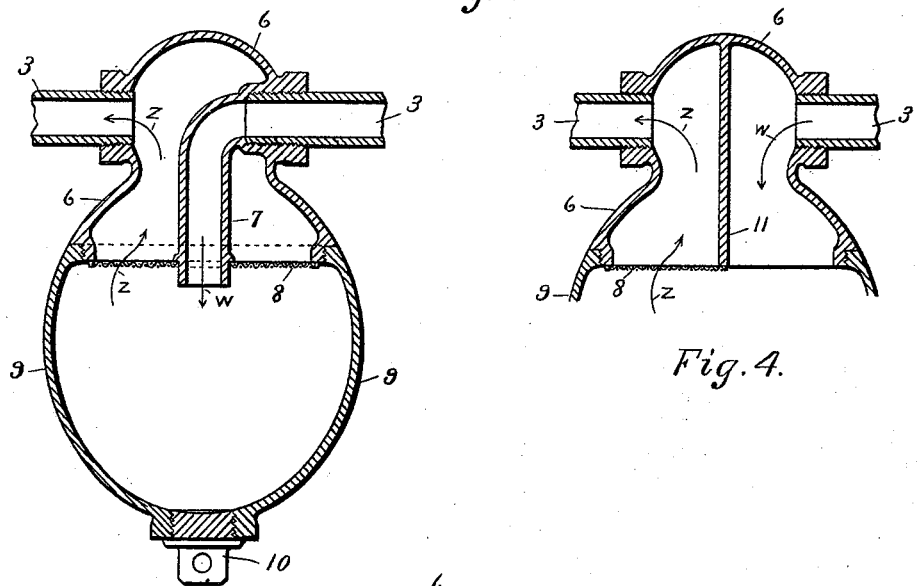
Figure 3:
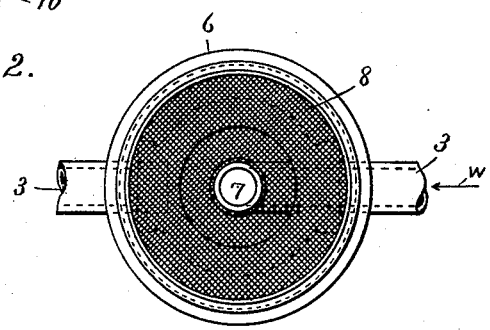

Figure 1, is a side elevation of a gasoline stove provided with my improved filtering device. Fig. 2, is an enlarged detail, in vertical section, of the filtering device. Fig. 3, is a plan view of the filtering device inverted and with the cup portion removed; and Fig. 4 shows a modification.

In the drawings 1 designates a gasoline stove of the usual or any suitable construction; 2, the tank for holding the gasoline; 3, the pipe for conducting it to the burner or burners; and 4 the burner and usual, or suitable, devices for controlling the flow of the liquid.

At a convenient point between the tank and the burner, preferably on a horizontal portion of the pipe, is interposed the filtering device 5. This device may be of any convenient or desired form, comprising a hollow body in which the gasoline is compelled to descend into a settling chamber and rise through a filtering medium before passing onward through the pipe to the burner.

In the form of device illustrated in Fig. 2 a shell 6 is coupled to opposite ends of sections of the pipe 3 and has a pendent tubular portion 7 in communication with the inflow portion of the pipe. Above the lower end of this tube 7 is a filter or screen 8 of finely woven wire-cloth or other material suitable for the purpose. A cup 9 is screwed onto the shell 6, or otherwise suitably connected to its base, to provide a chamber for retaining solid substances, or water, &c., that may be introduced through the in-take pipe. At the bottom of this cup is a screw-plug 10 which can be removed when necessary to permit the discharge of such matter as may have accumulated in the chamber of the cup.

In use, as will be apparent, the gasoline, in passing from the tank to the burner descends first into the chamber of the cup, as indicated by the arrow $w$, and thence can pass onward toward the burner only by rising through the filtering medium 8, as indicated by the arrow $z$; whereby heavy particles, as well as liquid heavier than the gasoline, are allowed to settle in the chamber of the cup, and light particles, which might otherwise pass onward, are caught by the strainer 8.

In the modification shown in Fig. 4, instead of the pendent tube 7, a partition 11 is substituted and so arranged that the liquid may pass freely downward at one side of the partition and flow onward only through a filtering medium 8, as in the other form of construction.

Other modifications within the same plan of operation will readily suggest themselves to one skilled in such matters.

By use of a filtering device of the character suggested the most common causes of explosions and accidents in connection with the use of gasoline stoves and other gasoline burners are avoided. The most frequent causes of trouble arise from particles of solid matter temporarily obstructing the small appertures at the burner; or the admixture of water with the gasoline at the point of ignition; and in either event the flame may be extinguished, while the flow of gasoline may continue, so that when subsequently ignited it will cause disastrous explosions. These dangers are obviated by the present improvement, for solid substances, as well as heavy liquids, will be caught and retained in the filter cup.

Having described my invention, what I claim is—

1. The combination with a pipe for conducting gasoline to the burner; of a filtering device consisting of a two part shell the upper portion of which is connected with the pipe and provides an inflow conduit to the lower portion, a screen above the mouth of the inflow connection, whereby the lower member is made a settling chamber and the gasoline is forced to rise through the screen to the outflow portion of the pipe, substantially as and for the purposes set forth.

2. The combination with a pipe for conducting gasoline to a burner; of a filtering device consisting of a shell coupled in the pipe and having a pendent internal inflow connection formed integrally therewith, a second shell detachably connected to the first and providing a settling chamber, and a screen above the mouth of the inflow connection and between it and the outflow pipe, substantially as and for the purposes set forth.

CHARLES S. WHITE.

Witnesses:
P. H. GUNCKEL,
RENZY BLUME.